Oct. 26, 1971　　　　　　　L. F. KAMP　　　　　3,614,920
SELF-DEVELOPING CAMERA WITH PIVOTABLE PLATEN
Filed Oct. 15, 1968　　　　　　　　　　　　3 Sheets-Sheet 1
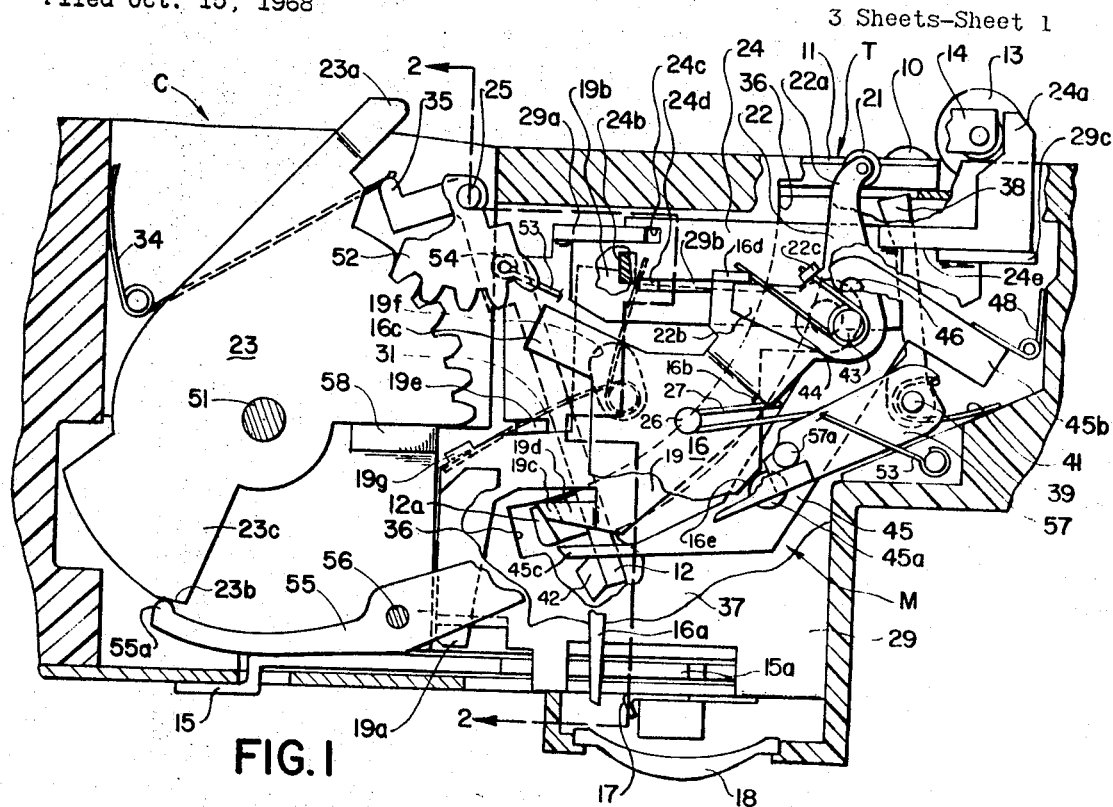
FIG. 1
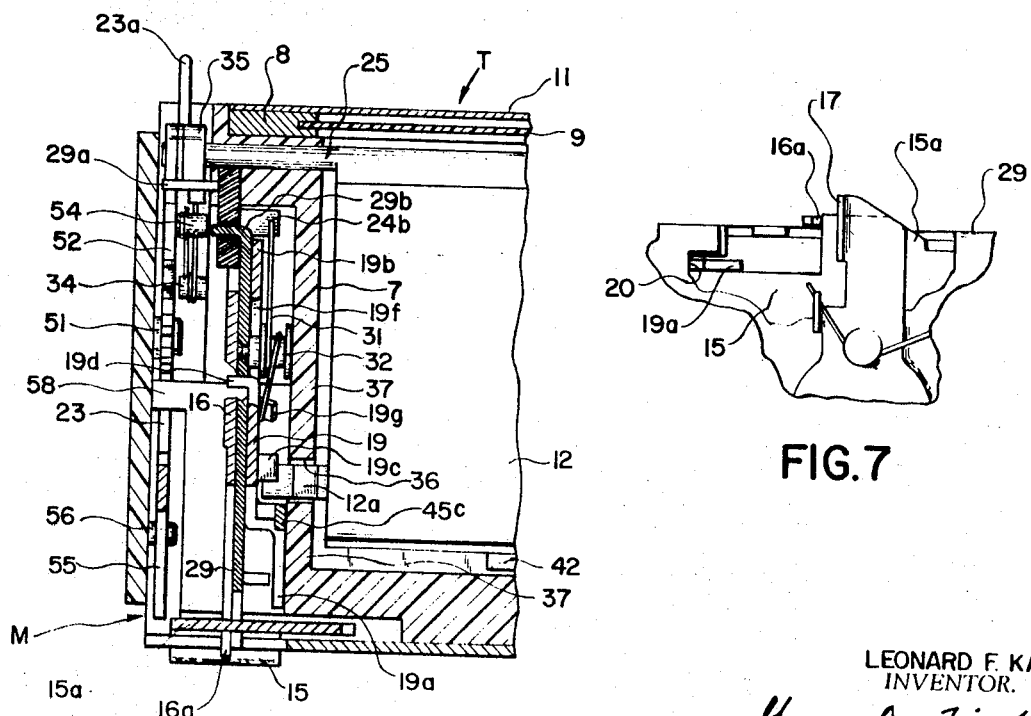
FIG. 2
FIG. 7
LEONARD F. KAMP
INVENTOR.
BY Gary D. Fields
R. D. Hampton
ATTORNEYS

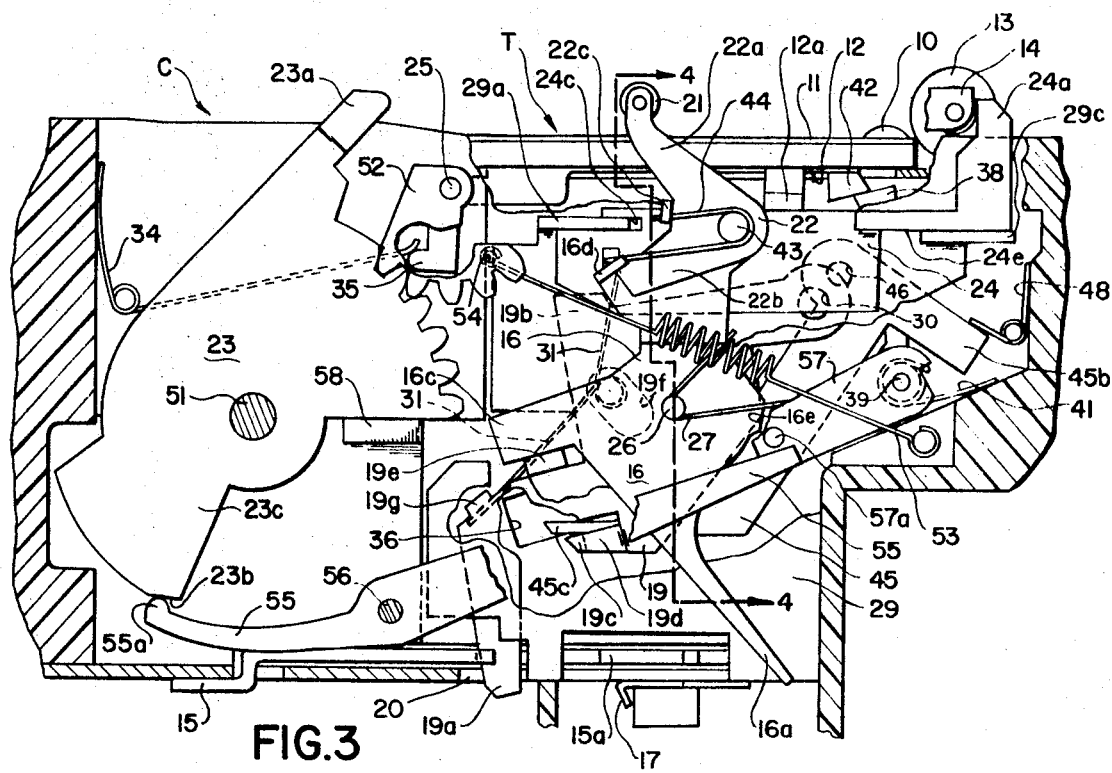

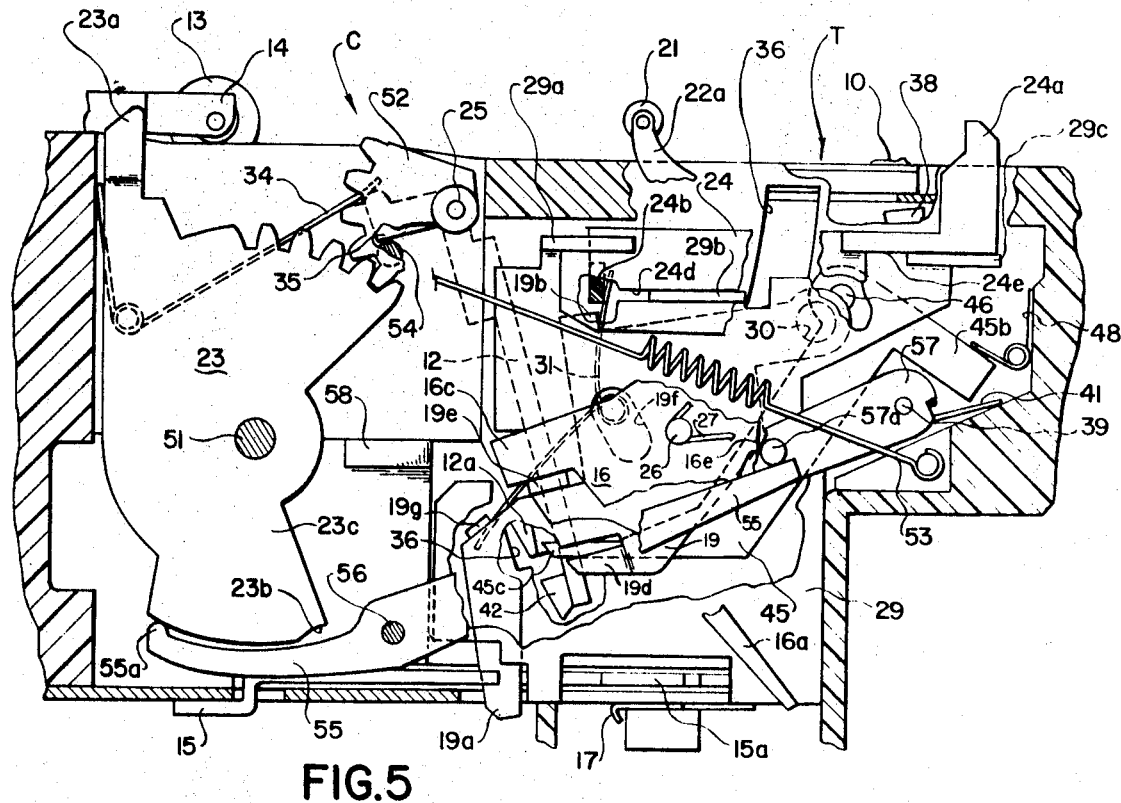

3,614,920
SELF DEVELOPING CAMERA WITH
PIVOTABLE PLATEN
Leonard F. Kamp, Rochester, N.Y., assignor to Eastman
Kodak Company, Rochester, N.Y.
Filed Oct. 15, 1968, Ser. No. 767,621
Int. Cl. G03b 17/52
U.S. Cl. 95—13                                    8 Claims

ABSTRACT OF THE DISCLOSURE

A pivotal platen mechanism is provided for use in a camera in which slide transparency units are both exposed and processed. The platen pivots out of the exposure plane before exposure of the film and then pivots into the exposure plane to support the film during spreading of a developing fluid across the film.

CROSS-REFERENCE TO RELATED APPLICATIONS

The mechanism of this invention could be utilized in the camera disclosed in commonly assigned U.S. Pat. No. 3,541,937 to Hubert Nerwin, entitled "Camera and Method for Exposing and Developing Slide Transparency Units."

BACKGROUND OF THE INVENTION

Field of the invention

This invention relates to a mechanism for processing a latent image on a film within a camera after exposure. More particularly, the present invention relates to a platen mechanism for supporting a transparency unit after exposure so that a developing fluid may be spread thereacross.

Description of the prior art

In the prior art, cameras for both exposing and developing slide transparency units have been provided wherein the unit is moved, after exposure, by a suitable mechanism through a pair of rollers which spread developing fluid across exposed film for processing. In Friedman et al. U.S. Pat. No. 3,225,670, the transparency units are each provided with leaders for pulling them past a roller which ruptures a pod of processing fluid and spreads it across the transparency unit as the unit is moved from the exposure chamber into an adjacent developing chamber. In Finelly et al, U.S. Pat. No. 3,350,990, a reciprocating mechanism is provided which moves the transparency unit from an exposure chamber to an adjacent developing chamber through a pair of rollers which rupture a pod of developing fluid and spread it across the transparency. Thus, in none of these cameras can the transparency unit be both exposed and developed within a single chamber.

SUMMARY OF THE INVENTION

In the present invention, a camera is provided wherein the transparency unit may be both exposed and processed within a single chamber. Upon operation of the shutter release, a platen is pivoted into and locked in the exposure plane behind an exposed transparency unit. Then upon operation of a slide mechanism, which includes a roller for rupturing a pod on the transparency unit containing developing fluid, the pod is ruptured and the fluid spread across the transparency. During this time, the platen supports the transparency as the roller moves thereacross to assure even distribution of the developing fluid. Movement of the slide mechanism continues beyond the exposed transparency unit toward a storage chamber to engage a second transparency unit and move it into the exposure position. This continued movement causes the platen to be retracted for the next exposure. Upon return movement of the slide mechanism, the shutter is cocked so that the camera is ready for the next exposure.

Additional novel features of this invention will become apparent from the description which follows, taken in conjunction with the accompanying drawings.

BRIEF DESCRIPTION OF THE DRAWINGS

FIG. 1 is a fragmentary section through a camera housing showing the position of the platen and control mechanism before exposure of a transparency unit;

FIG. 2 is an offset section, taken along line 2—2 of FIG. 1, showing further details of the platen and control mechanism;

FIG. 3 is a fragmentary section, similar to FIG. 1, but showing the platen mechanism in transparency-supporting position after exposure;

FIG. 4 is an offset section, taken along line 4—4 of FIG. 3, showing details of the platen latch mechanism;

FIG. 5 is a fragmentary section, similar to FIGS. 1 and 4, but showing the platen mechanism retracted after the pressure roller has spread developed fluid across a transparency unit;

FIG. 6 is a fragmentary section, similar to FIGS. 1, 4, and 5, showing the position of the platen mechanism just prior to final retraction of a double exposure prevention lever; and FIG. 7 is a fragmentary section, taken along line 7—7 of FIG. 6, showing details of a shutter release lever.

DESCRIPTION OF THE PREFERRED EMBODIMENT

In accordance with this invention, a camera C is provided for the exposure and processing of slide transparency units. The camera C includes an exposure chamber 7 having means for receiving and holding a slide transparency unit T in a focal plane therein, said transparency unit including a mount 8 in which a transparency 9 is supported and having a pod 10 of developing agent, such as a fluid, adjacent the transparency, as best shown in FIGS. 2 and 4. A strippable sheet 11 extends over the pod and transparency, as shown. The camera is provided with a platen mechanism M, adjacent exposure chamber 7, which includes a platen 12 in exposure chamber 7 for supporting transparency 9 after exposure so that a development fluid (not shown) may be spread thereacross between transparency 9 and sheet 11 by a roller 13 which is connected to a slide mechanism 14 for sequentially transporting slides from an adjacent storage chamber (not shown) into the exposure chamber. Conveniently, the storage chamber may be located to the left of exposure chamber 7, as viewed in FIG. 1 and as shown in commonly assigned copending U.S. Pat. No. 3,541,937 to Hubert Nerwin. A general description of the sequential movement of the various parts will facilitate an understanding of the detailed description which follows.

Upon moving shutter release lever 15 downward as viewed in FIGS. 1 and 7, shutter drive plate 16 is pivoted in a counterclockwise direction, as shown in FIGS. 1 and 6 so that shutter release arm 16a trips shutter blade arm 17 to expose the transparency through lens 18. Double exposure prevention lever 19 also rotates counterclockwise, as shown. Upon release of shutter release lever 15, it is returned to its initial position by resilient means (not shown) and an end 19a of double exposure prevention lever 19 enters notch 20 therein to prevent a second actuation of the shutter release lever 15. Also, upon release of shutter release lever 15, platen 12 is rotated in a counterclockwise direction from the FIG. 1 position to a position adjacent the focal plane to support transparency 9, as in FIG. 3. Next, slide mechanism 14 is moved to the left so that rollers 13 ruptures pod 10 and spreads the developing fluid across transparency 9. During this movement, slide mechanism 14 overrides roller 21 on arm 22a of cocking lever 22 and engages arm 23a of retraction gear 23, as in FIG. 5 causing platen 12 to be lowered. Upon the return movement of slide mechanism 14 from the storage chamber to bring another transparency unit into position, it will engage roller 21 of cocking lever arm 22a to cock shutter drive plate 16 by rotating it in a clockwise direction and double exposure prevention lever 19 clockwise to the position of FIG. 6. At this point end 19a is still engaged in notch 20 to prevent operation of shutter release lever 15. However, slide mechanism 14 then strikes ear 24a of double exposure release mechanism 24 which is slid to the right so that end 19a of the double exposure prevention lever 19 is withdrawn from notch 20 of shutter release lever 15. At this point, the camera is ready for the next exposure.

With this general description of the operation of platen mechanism M, a more detailed description will be given. Platen 12 is pivotally mounted on a shaft 25 and is shown in FIG. 1 pivoted to an open position out of the exposure plane so that light rays entering through lens 18 will strike transparency 9 of the transparency unit T in the exposure chamber 7. The platen is held in the open position by a platen release means, such as lug 19c, shown best in FIGS. 1 and 2, which extends inwardly from a finger 19d on double exposure prevention lever 19 and engages latching ear 12a of platen 12 when the shutter release lever 15 is actuated to release shutter release arm 16a from shoulder 15a on the shutter release lever. Thus, shutter driver plate 16 rotates counterclockwise about shaft 26 by spring 27 which has one end in a notch 16b of the shutter drive plate 16 and the other end engaging a stop 28, shown in FIG. 4 on camera mechanism plate 29. As previously described, this movement causes shutter release arm 16a to strike shutter blade arm 17 to make the exposure. During counterclockwise rotation of the shutter drive plate 16, a stop arm 16c thereon strikes ear 19e on double exposure prevention lever 19 thereby also pivoting the latter counterclockwise about shaft 30, extending from plate 29 as in FIG. 4, against the force of spring 31 mounted on stud 32 of plate 29, extending through slot 19f. Spring 31 has one end engaging flange 19g on double exposure prevention lever 19 and the other end engaging lip 24b on double exposure release mechanism 24 as seen in FIGS. 1 and 2. This movement has caused lug 19c to move downwardly along latching ear 12a but not off of it because end 19a strikes the back of shutter release lever 15. When the shutter release arm 16a is released, arm 19a will pass through notch 20, as best seen in FIGS. 3 and 7 which controls the release of the platen 12. Thus, double exposure prevention lever 19 is permitted to rotate further in the counterclockwise direction, as shown in FIG. 3 by arm 16c under the influence of spring 27 which conveniently is stronger than spring 31. Thus, lug 19c is moved out of engagement with latching ear 12a so that platen 12 is rotated in a counterclockwise direction about shaft 25 under the influence of spring 34 having one end in engagement with the housing and the other end engaging a foot 35 attached to and rotatable with shaft 25. Thus, only after release of shutter release lever 15 is platen 12 released. As platen 12 moves to the position shown in FIG. 3, wherein it engages and supports transparency 9, latching ear 12a moves along arcuate slot 36 in side wall 37 of exposure chamber 7 until platen 12 engages and supports transparency 9. A cushion of air between platen 12 and transparency 9 lessens shock as the platen engages the transparency. The platen is held in this position by a lock means such as latch 38 which is pivoted about shaft 39 and normally urged in a counterclockwise position by spring 41, see FIGS. 1 and 3. As the platen moves to its position, latch 38 is cammed out of the way by catch 42 which then rests against the latch, as shown in FIG. 3.

Cocking lever 22 is mounted on a shaft 43 extending from shutter drive plate 16 and has an arm 22b which engages an ear 16d on the shutter drive plate so that it is rotated therewith into operative position above the plane of transparency T, as shown in FIG. 3. Arm 22b is held against ear 16d by spring 44 extending around shaft 43, as shown, and having one end engaging ear 16d and the other end engaging a lip 22c on cocking lever 22.

A platen latching lever 45 is mounted for rotation about a pin 46 mounted on side wall 37, as best seen in FIG. 4. During the counterclockwise rotation of shutter drive plate 16, a cam surface 16e rides off of stud 45a (see FIG. 6) so that platen latching lever 45 pivots clockwise under the influence of spring 48 against arm 45b to move lip 45c into alignment with arcuate slot 36 for engagement with the latching ear 12a when platen 12 is opened for the next exposure, as described below.

In order to accomplish the in-camera processing operation, transport the processed transparency unit out of the camera and transport an unexposed transparency unit into position in the exposure chamber 7, the camera user manually operates the slide mechanism 14 in a reciprocal fashion. Thus, to process transparency unit T which has just been exposed, slide mechanism 14 is moved from the righthand position shown in FIG. 3 to the lefthand position shown in FIG. 5. At the beginning of this movement, slide mechanism 14 moves away from ear 24a of double exposure release member 24 which follows a short distance under the influence of spring 31 until lip 24b is in position to engage arm 19b of double exposure prevention lever 19 during the cocking operation, as described below. Conveniently, double exposure release mechanism 24 is mounted for sliding movement along flanges 29a, 29b and 29c of mechanism plate 29, which are engaged respectively by slots 24c and 24d and surface 24e, as best seen in FIG. 1.

Next roller 13 will rupture pod 10 and spread the developing fluid between transparency 9 and sheet 11 while the transparency is supported by platen 12.

As slide mechanism 14 continues to move to the left, it rides over shutter cocking lever 22 by rolling over roller 21 so that cocking lever 22 is rotated counterclockwise about shaft 43 and then is returned to the position shown in FIG. 3 by spring 44. Next, slide mechanism 14 engages arm 23a of gear 23 causing the gear to be rotated in a counterclockwise direction about shaft 51 which in turn drives pinion 52 in a clockwise direction about shaft 25 against the force of spring 53, having one end attached to a stud 54 on the pinion and the other end attached to the camera housing, to the position shown in FIG. 5.

Rotation of gear 23 also causes a recess or offset 23b on leg 23c to move off of lip 55a of lever 55 causing the lever to be rotated in a counterclockwise direction about shaft 56. The opposite end of lever 55 acts upon stud 57a of latch release arm 57, fixedly attached to shaft 39 to rotate latch 38 in a clockwise direction to release platen 12.

As pinion 52 rotates in the clockwise direction, stud 54 moves from the position shown in FIG. 3 into engagement with foot 35, after latch 38 has released the platen. This rotates platen 12 to the open position, shown in FIG. 5 against the force exerted on it by spring 34. As the platen moves to the open position latching ear 12a cams past lip 45c of platen latching lever 45 and is latched therebehind, as seen in FIG. 5.

Upon the return travel of slide mechanism 14, i.e., from the FIG. 5 position to the FIG. 6 position during which another transparency unit T is brought into position spring 53 will cause pinion 52 and hence gear 23 to be returned to their rest positions, shown in FIG. 6, wherein gear 23 rests against stop 58. This movement causes lip 55a of lever 55 to move into offset 23b permitting latch release arm 57 and latch 38 to rotate in a counterclockwise direction under the influence of spring 41 so that the latch is in position to engage the platen when it is raised after the next exposure. As slide mechanism 14 moves to the right, it will engage arm 22a of shutter cocking lever 22, rotating the shutter cocking lever, shutter driver plate 16 and double exposure prevention lever 19 about shaft 26 in a clockwise direction. Plate 16 is rotated until shutter release arm 16a slides over shoulder 15a of shutter release lever 15 and shutter blade arm 17 because of the engagement of arm 22b with ear 16d.

Double exposure prevention lever 19 rotates in a clockwise direction about shaft 30 under the influence of spring 31 until arm 19b engages stop 24b on double exposure release mechanism 24. This rotation is sufficient to move lug 19c in front of platen latching ear 12a but not sufficient to move double exposure lever end 19a out of locking engagement with shutter release lever 15, as shown in FIG. 6. In phase with the rotation of double exposure prevention lever 19, the lip 45c of the platen latching lever 45 is moved out of latching engagement with latching ear 12a by the camming action of surface 16e of shutter drive plate 16 on stud 45a. Thus, platen 12 rotates a very small angular distance in the counterclockwise direction, as lip 45c is moved out of engagement with ear 12a until the ear engages lug 19c.

Referring now to FIG. 1, it can be seen that the continued movement of the slide mechanism 14 to the right will cause it to engage ear 24a of double exposure release mechanism 24 thereby moving the latter to the right so that stop 24b is moved out of engagement with arm 19b, thereby permitting double exposure prevention lever 19 to rotate further in a clockwise direction so that end 19a is out of engagement with shutter release lever 15. Platen mechanism M is then ready for the next exposure.

From the foregoing, the advantages of this invention are readily apparent. Upon actuation of the shutter release lever, a platen is pivoted into supporting position behind an exposed transparency during spreading of a developing fluid. The reciprocal movement of a slide mechanism which advances the slide transparencies also serves to spread the developing fluid across the transparency while the platen is in position. In addition, the slide mechanism retracts the platen after the developing fluid has been spread and upon movement of another slide transparency into the exposure chamber cocks the shutter and inactivates a double exposure prevention mechanism.

The invention has been described in detail with particular reference to a preferred embodiment thereof, but it will be understood that variations and modifications can be effected within the spirit and scope of the invention as described hereinabove and as defined in the appended claims.

I claim:

1. Photographic apparatus for establishing the position of a photosensitive element at an exposing and processing station in the apparatus, the photosensitive element defining first and second sides and being exposable from the second side and developable by spreading a processing composition across the first side, the apparatus comprising:

means for establishing an exposing and processing station in the apparatus and for locating the photosensitive element at such station; and a support platen movable between a first position spaced from the photosensitive element in the exposing and processing station, for permitting exposure of the photosensitive element from the second side of the element, and a second position adjacent the second side of the element in the exposing and processing station, for securely supporting the photosensitive element to permit spreading of the processing composition across the element.

2. In a camera having means defining an exposure position for exposing and developing a substantially flat photosensitive element including first and second sides, the improvement comprising:

means for establishing the photosensitive element in the exposure position for recording a latent image in the element;

means for spreading a developing agent across the first side of the photosensitive element after exposure to effect development of the latent image; and support means movable from a first position spaced from the photosensitive element during exposure, to a second position on the second side of the photosensitive element after exposure, for supporting the photosensitive element in the exposure position while the developing agent is spread across the element.

3. In a camera, as claimed in claim 2, and having a shutter mechanism operative to effect the exposure of the photosensitive element, the improvement further comprising:

control means coupled to said support means and responsive to operation of the shutter mechanism for moving said support means from the first position to the second position after exposure of the photosensitive element.

4. In a camera for exposing and developing a transparency frame, wherein the frame defines first and second sides, and includes means for recording a latent image developable by a fluid adapted to be applied to the first side, and wherein the camera includes means defining a focal plane position, means for holding a transparency frame in the focal plane position during exposure and during the application of the fluid, and means on one side of the focal plane position for applying the fluid to a transparency frame in the focal plane position, the improvement comprising:

a support movable between a first position spaced from the focal plane position for permitting exposure of the transparency frame, and a second position adjacent the focal plane position for rigidly supporting the transparency frame and permitting the application of the fluid, said support means in its second position being on the opposite side of the focal plane position from the flud applying means.

5. In a camera, as claimed in claim 4, and having a shutter mechanism operative to effect the exposure of the photosensitive element, the improvement further comprising:

control means responsive to operation of the shutter mechanism and coupled to said support for moving said support from the first position to said second position.

6. In a camera, as claimed in claim 4, the improvement further comprising:

return means coupled to the fluid applying means for moving said support from said second position to said first position after the fluid has been applied to a transparency frame.

7. A method of exposing and developing a photographic element defining first and second sides and including photosensitive material for recording a latent image, the method comprising the step of:

locating the photographic element in a position for both exposing and developing the element in that position;

exposing the photosensitive element from the second side to establish a latent image in the photosensitive material;

applying a developing fluid to the first side of the exposed photosensitive element to effect development of the latent image; and supporting the photosensitive element in the exposing and processing position from the second side of the element while said fluid is applied to the first side of the element.

8. A method, as claimed in claim 7, including the further steps of:

discontinuing the support of the photosensitive element after development of the latent image; and removing the element from the exposing and developing position.

References Cited
UNITED STATES PATENTS

| | | | |
|---|---|---|---|
| 2,443,154 | 6/1948 | Wolff | 95—13 |
| 3,264,961 | 8/1966 | Tuttle et al. | 95—12 |
| 3,472,138 | 10/1969 | Robin et al. | 95—13 |

SAMUEL S. MATTHEWS, Primary Examiner

M. L. GELLNER, Assistant Examiner

U.S. Cl. X.R.

95—31 AC